United States Patent
Wama et al.

(10) Patent No.: US 10,933,809 B2
(45) Date of Patent: Mar. 2, 2021

(54) VEHICLE LAMP LIGHTING CONTROL DEVICE

(71) Applicant: KOITO MANUFACTURING CO., LTD., Tokyo (JP)

(72) Inventors: Takenori Wama, Shizuoka (JP); Mitsuharu Mano, Shizuoka (JP); Takanori Namba, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/349,684

(22) PCT Filed: Nov. 16, 2017

(86) PCT No.: PCT/JP2017/041241
§ 371 (c)(1),
(2) Date: May 14, 2019

(87) PCT Pub. No.: WO2018/101060
PCT Pub. Date: Jun. 7, 2018

(65) Prior Publication Data
US 2019/0359131 A1    Nov. 28, 2019

(30) Foreign Application Priority Data
Nov. 29, 2016  (JP) .............................. JP2016-230769

(51) Int. Cl.
*B60Q 11/00* (2006.01)
*B60Q 1/04* (2006.01)
(Continued)

(52) U.S. Cl.
CPC .............. *B60Q 11/005* (2013.01); *B60Q 1/04* (2013.01); *G06K 9/00825* (2013.01);
(Continued)

(58) Field of Classification Search
CPC .. B60Q 11/005; B60Q 1/04; B60Q 2300/146; G06K 9/00825; G07C 5/0825; H04N 5/374
See application file for complete search history.

(56) References Cited

U.S. PATENT DOCUMENTS

| | | | | |
|---|---|---|---|---|
| 6,152,588 A | * | 11/2000 | Scifres ................. | B60Q 1/0011 362/231 |
| 2006/0061466 A1 | * | 3/2006 | Garcia Briz .......... | H05B 45/10 340/479 |

(Continued)

FOREIGN PATENT DOCUMENTS

| | | |
|---|---|---|
| DE | 102005055087 A1 | 5/2007 |
| EP | 2541130 A2 | 1/2013 |

(Continued)

OTHER PUBLICATIONS

International Search Report issued in PCT/JP2017/041241; dated Feb. 6, 2018.

(Continued)

*Primary Examiner* — Renan Luque
(74) *Attorney, Agent, or Firm* — Pearne & Gordon LLP (57) ABSTRACT

Provided is a vehicle lamp lighting control device which ensures proper lighting control of a lamp even when an abnormality occurs in the lamp or a camera. The vehicle lamp lighting control device includes a plurality of lamps (L-HL, R-HL) mounted on a vehicle, and each of the lamps includes a lamp unit (2) for illuminating a required region, an imaging unit (4) for imaging the required region, and a lamp control unit (5) for controlling lighting of the lamp unit (2) based on a captured image. When one lamp of the plurality of lamps is abnormal, the lamp control unit (5) of another lamp controls lighting of at least one normal lamp unit (2) of the plurality of lamps.

20 Claims, 7 Drawing Sheets

(51) Int. Cl.
*G06K 9/00* (2006.01)
*G07C 5/08* (2006.01)
*H04N 5/374* (2011.01)

(52) U.S. Cl.
CPC ...... *G07C 5/0825* (2013.01); *B60Q 2300/146* (2013.01); *H04N 5/374* (2013.01)

(56) References Cited

U.S. PATENT DOCUMENTS

| | | | |
|---|---|---|---|
| 2008/0084165 A1* | 4/2008 | Otsuka | B60Q 1/0023 315/82 |
| 2010/0049454 A1* | 2/2010 | Irissou | H05B 33/0893 702/58 |
| 2013/0003403 A1 | 1/2013 | Takahira et al. | |
| 2013/0076240 A1* | 3/2013 | Endo | B60Q 1/085 315/82 |
| 2014/0232265 A1* | 8/2014 | Masuda | B60Q 1/1423 315/82 |
| 2014/0254188 A1* | 9/2014 | Masuda | F21S 41/675 362/521 |
| 2015/0266409 A1* | 9/2015 | Akiyama | B60W 30/165 701/49 |
| 2015/0308648 A1 | 10/2015 | Takahira et al. | |
| 2016/0341655 A1* | 11/2016 | Jha | F21V 5/045 |
| 2016/0368413 A1* | 12/2016 | Nishii | B60Q 1/085 |
| 2018/0042064 A1* | 2/2018 | Norton | H04W 76/18 |

FOREIGN PATENT DOCUMENTS

| | | | |
|---|---|---|---|
| EP | 2541130 A3 | | 9/2015 |
| JP | 2004-168209 A | | 6/2004 |
| JP | 2004168209 A | * | 6/2004 |
| JP | 2008-094127 A | | 4/2008 |
| JP | 2010-184540 A | | 8/2010 |
| JP | 2010-260379 A | | 11/2010 |
| JP | 2013-147138 A | | 8/2013 |
| JP | 2014-019347 A | | 2/2014 |
| JP | 2014024422 A | * | 2/2014 |

OTHER PUBLICATIONS

Extended European Search Report issued for the corresponding European Patent Application No. 17876776.0 dated May 6, 2020.

\* cited by examiner

| | DISPLAY OF ABNORMALITY | MEASURE AGAINST ABNORMALITY | LIGHTING CONTROL FS-c2 |
|---|---|---|---|
| (c2) ABNORMAL FORM IN OTHER-VEHICLE DETECTION ABNORMALITY, DETERMINATION METHOD | | | ABNORMAL HEADLAMP FORCIBLY CONTROLS MAIN LAMP UNIT TO LOW BEAM LIGHT DISTRIBUTION<br><br>SUB-LAMP UNIT IS NOT CONTROLLED, AND A STATE OF TURNING ON OR OFF IS MAINTAINED<br><br>CONTROLS LIGHTING OF MAIN LAMP UNIT BY ABNORMAL HEADLAMP BASED ON THE OTHER VEHICLE DETECTED FROM IMAGE CAPTURED BY NORMAL HEADLAMP<br><br>OUTPUTS IMAGE CAPTURED BY NORMAL HEADLAMP AS IT IS TO LAMP ECU OF ABNORMAL HEADLAMP |
| (p) DEPOSIT: WATER DROPLETS<br><br>LIGHT SPOT CAUSING WHITEOUT ( ) TEMPORARILY APPEARS AT NIGHT AND CONTINUOUSLY STAYS AT THE SAME POSITION FOR A SHORT TIME (SEVERAL SECONDS TO A FEW MINUTES) | DISPLAYS THAT WATER DROPS ADHERE | MEASURE MAY NOT BE INFORMED | |
| (q) DEPOSIT: MUD, INSECT<br><br>DETERMINED BY SHAPE OF IMAGE OR DEGREE OF BLURRING OF EDGE IN THE DAYTIME. TEMPORARY DISAPPEARANCE OF VEHICLE OR DISTURBANCE LIGHT ALWAYS OCCURS AT THE SAME PLACE AT NIGHT | DISPLAYS THAT MUD, INSECT OR THE LIKE ADHERES | INFORMS TO REMOVE DEPOSIT | |
| (r) SCRATCH OR THE LIKE<br><br>IMAGE WHILE CAR IS RUNNING IS PRESENT AT A CERTAIN POSITION FOR A LONG TIME. WHEN ANOTHER IMAGE IS MOVED TO THE POSITION, A SHAPE OF THE OTHER IMAGE CANNOT BE DETERMINED. | DISPLAYS THAT SCRATCH OR THE LIKE OCCURS AND A POSITION OF THE SCRATCH OR THE LIKE | INFORMS TO REPAIR OR REPLACE HEADLAMP HAVING SCRATCH | |

VEHICLE LAMP LIGHTING CONTROL DEVICE

TECHNICAL FIELD

The present invention relates to a device for controlling a lighting state of a vehicle lamp, and more particularly to a vehicle lamp lighting control device suitable as a device for controlling light distribution of a pair of headlamps provided on left and right of a vehicle.

BACKGROUND ART

In the vehicle such as a car, in order to realize automatic driving control and automatic light distribution control of the headlamps, it has been proposed to provide a camera (an imaging device) in the car, to capture an image in a region in front of the car by the camera, and to analyze the captured image to detect other vehicles such as an oncoming vehicle and a preceding vehicle present in the region in front of the car. For example, ADB (Adaptive Driving Beam) light distribution control has been proposed as a technology for controlling light distribution of the headlamps (headlights) of the car. The ADB light distribution control is a technology that controls a part of light distribution pattern of high beam light distribution of the headlamps so as not to dazzle other vehicles such as the oncoming vehicle and the preceding vehicle detected from the image captured by the camera.

Although it is preferable to provide the camera at a high position inside a front window of the car in consideration of imaging the region in front of the car, when it is applied to the ADB light distribution control, since positional displacement between a lamp optical axis of the headlamp and an imaging optical axis of the camera is large, it is difficult to realize highly accurate ADB light distribution control. Therefore, Patent Literature 1 proposes a technology in which the camera is installed in a lamp housing of one headlamp of the left and right headlamps.

According to Patent Literature 1, since a camera optical axis is close to the lamp optical axis, a direction of another vehicle detected from the image captured by the camera, that is, an angle when the other vehicle is viewed from own vehicle coincides with or substantially coincides with an angle of light emitted from the headlamp, and thus it is possible to perform the ADB light distribution control in the headlamp easily and accurately.

CITATION LIST

Patent Literature

Patent Literature 1: JP-A-2013-147138

SUMMARY OF THE INVENTION

Problems to be Solved by the Invention

The technology of Patent Literature 1 is configured to perform the ADB light distribution control in one of the headlamps in which the camera is installed. Therefore, when an abnormality occurs in the camera or when an abnormality occurs in the one of the headlamps in which the camera is installed, the ADB light distribution control cannot be performed accurately. Further, even if there is no abnormality in the camera, the captured image is unclear due to dirt, a scratch or the like on the headlamp, and it is not possible to accurately detect other vehicles, and thus it is difficult to accurately perform the ADB light distribution control.

An object of the present invention is to provide a vehicle lamp lighting control device which can ensure proper lighting control of a lamp even when an abnormality occurs in the lamp or a camera.

Solution to the Problems

The present invention is a vehicle lamp lighting control device including a plurality of lamps mounted on a vehicle. Each of the lamps includes: a lamp unit for illuminating a required region; an imaging unit for imaging at least the required region; and a lamp control unit for controlling lighting of the lamp unit based on an image captured by the imaging unit. The plurality of lamps each independently controls lighting of the lamp unit. Here, it is preferred that when one lamp of the plurality of lamps is abnormal, the lamp control unit of another lamp controls the lighting of at least one normal lamp unit of the plurality of lamps.

Each of the lamps includes a monitoring unit for detecting abnormalities of the lamp unit, the imaging unit, and the lamp control unit of at least its own lamp. It is preferred that an abnormality display unit for displaying detected abnormality to an occupant is connected to the monitoring unit. Further, it may be configured such that the lamp control unit of an abnormal lamp or the lamp control unit of a normal lamp controls lighting of the lamp unit of the abnormal lamp based on the image captured by the imaging unit of the normal lamp.

Effects of the Invention

According to the present invention, in the plurality of lamps, the lighting of the lamp unit is controlled independently by each of the lamp control units when they are normal. When an abnormality occurs in any of the lamps, it is possible to control the lighting of the normal lamp unit by the lamp control unit of the normal lamp, thereby realizing lighting control with highly accurate light distribution.

DESCRIPTION OF THE EMBODIMENTS

Figure 1:
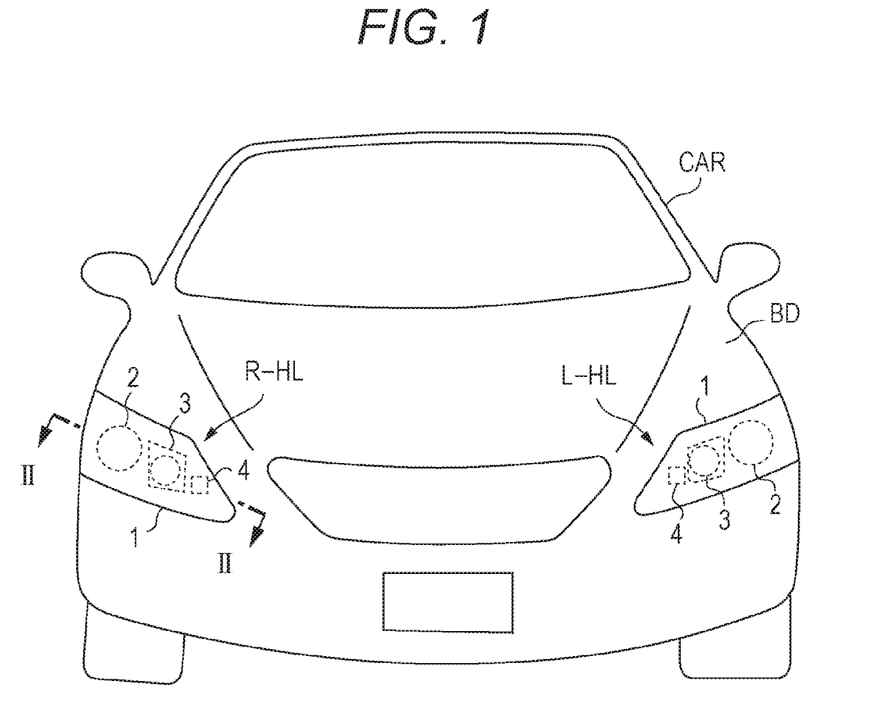
FIG. 1 is a front view of a car to which the present invention is applied.

Next, embodiments of the present invention will be described with reference to the drawings. FIG. 1 is a front view of an embodiment in which the present invention is applied to a headlamp of a car, and a left headlamp L-HL and a right headlamp R-HL are mounted on left and right front portions of a body BD of a car CAR. Since the left and right headlamps L-HL and R-HL are symmetrical to each other, the following description will be made the right headlamp R-HL as a representative.

In the right headlamp R-HL, a main lamp unit 2, a sub-lamp unit 3, and a camera 4 as an imaging unit are arranged in a lamp housing 1. Here, the main lamp unit 2 is disposed at an outer position in a vehicle width direction in the lamp housing 1, the sub-lamp unit 3 is disposed inside the main lamp unit 2, and the camera 4 is disposed inside the sub-lamp unit 3.

Figure 2:
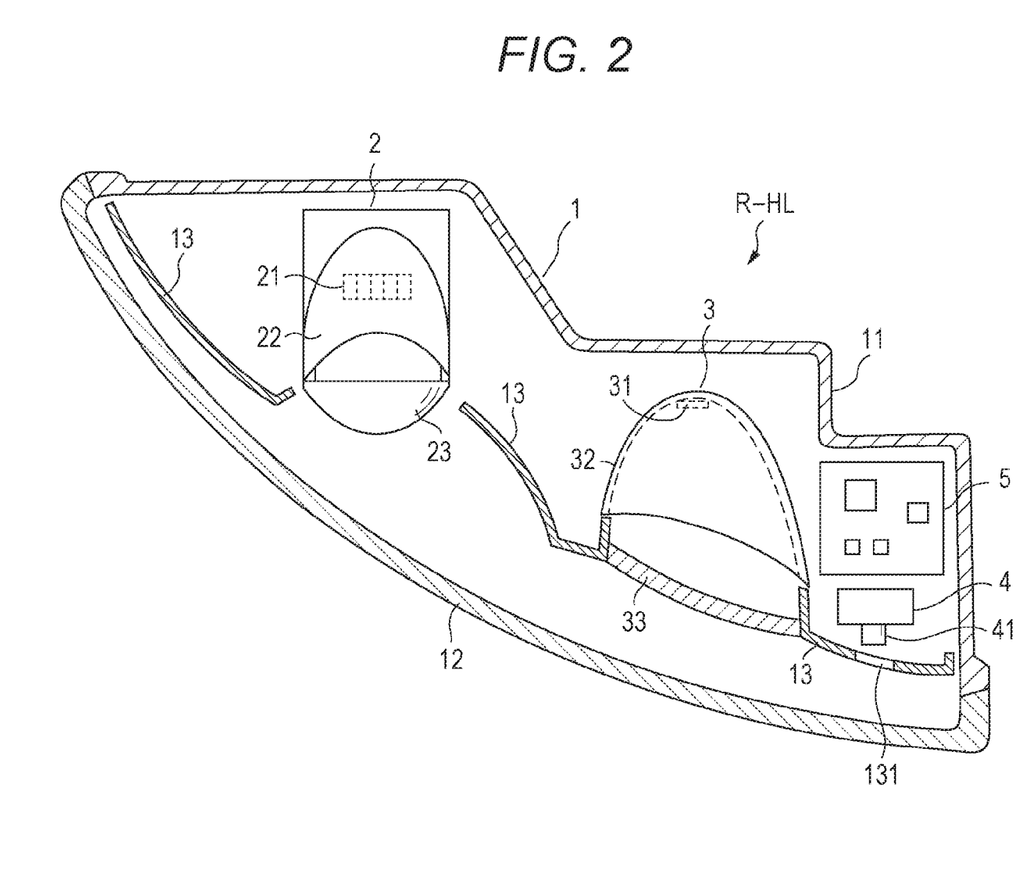
FIG. 2 is an enlarged cross-sectional view of a right headlamp of FIG. 1 taken along a line II-II.

FIG. 2 is a horizontal cross-sectional view of the right headlamp R-HL, and is an enlarged cross-sectional view taken along a line II-II of FIG. 1. The lamp housing 1 includes a container-like lamp body 11 having an opening in its front region, and a light transmitting cover 12 fixed to cover the opening of the lamp body 11. The light transmitting cover 12 is formed in a plate shape curved in a required shape with a transparent colorless resin, and transmits light emitted from the main and sub lamp units 2 and 3 to light the region in front of the car. Further, the camera 4 can capture the region in front of the car through the light transmitting cover 12.

An extension 13 is disposed in the lamp housing 1, and the extension 13 sequentially defines regions of a main lamp portion, a sub-lamp portion, and a camera portion from a left side of FIG. 2. The extension 13 is coated with aluminum or plated with aluminum to form a pseudo-reflector.

The main lamp unit 2 is configured as a projector type lamp unit, which uses a plurality of white LEDs (Light-Emitting Diodes) 21 as light sources, reflects white light emitted by the white LEDs 21 by the reflector 22, and projects the reflected light to light the front of the car by a projection lens 23. As described below, it is possible to control light distribution of the main lamp unit by switching between high beam light distribution and low beam light distribution by selecting and emitting the plurality of white LEDs 21. Further, in the same manner, it is possible to control the light distribution with ADB light distribution in which a partial region of light distribution pattern of the high beam light distribution is not selectively lighted.

The sub-lamp unit 3 is here configured as a clearance lamp. The clearance lamp 3 is configured as a reflector type lamp unit. Which uses a white LED 31 as a light source, reflects white light emitted from the white LED 31 by a reflector 32, and lights the front of the car with a required light distribution pattern by an inner lens 33 disposed in front of the reflector 32.

The camera 4 is configured as a camera including a CCD imaging device and a CMOS imaging device. The camera 4 is disposed behind the extension 13 and cannot be observed from the outside when viewed through the light transmitting cover 12 from the front of the headlamp R-HL. A lens barrel 41 of the camera 4 is disposed at a position facing an opening window 131 provided in the extension 13, and it is possible to image the region in front of the car through the opening window 131.

Further, in the lamp housing 1, a lamp ECU (Lamp Electronic Control Unit) 5 is disposed at a position not found out from the outside by the extension 13. This keeps design of the lamp. The lamp ECU 5 is electrically connected to the main lamp unit 2, the sub-lamp unit 3, and the camera 4 as described below, and in particular, performs ADB light distribution control of lighting states of the main lamp unit 2 and the sub-lamp unit 3 based on an image captured by the camera 4.

Figure 3:
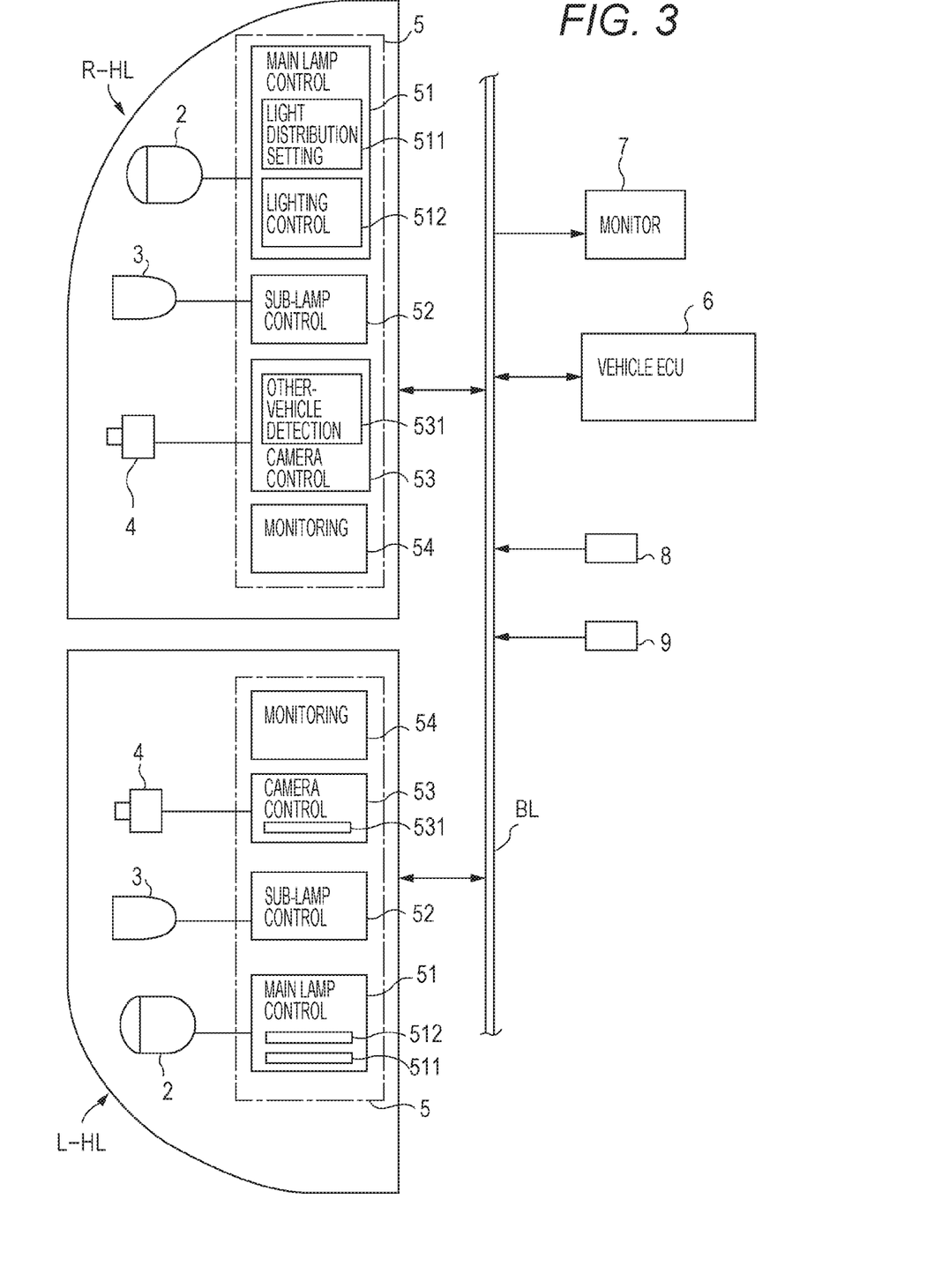
FIG. 3 is a block diagram of a lighting control device including left and right headlamps.

FIG. 3 is a block diagram of the left and right headlamps L-HL, and R-HL. Note that a part of configuration of the left headlamp L-HL is simplified. The lamp ECU 5 includes a main lamp control unit 51, a sub-lamp control unit 52, a camera control unit 53, and a monitoring unit 54. The main lamp control unit 51 performs on/off control of the main lamp unit 2, light distribution control of high beam/low beam, and ADB light distribution control. The sub-lamp control unit 52 performs on/off control of the sub-lamp unit 3.

The camera control unit 53 includes other-vehicle detection unit 531 for detecting another vehicle, that is, an oncoming vehicle and a preceding vehicle present in front of the car by analyzing the image captured by the camera 4. Further, the camera control unit 53 performs control related to imaging with the camera 4, for example, control of imaging timing, an image capturing operation, and the like.

The main lamp control unit 51 includes a light distribution setting unit 511 for setting an appropriate light distribution corresponding to the detected other vehicle, and a lighting control unit 512 for performing on/off control of the white LEDs 21 of the main lamp unit 2 as described later based on the set light distribution.

The monitoring unit 54 monitors each headlamp and outputs an abnormality signal when an abnormality is detected. The monitoring unit 54 can also detect an abnormality in the lamp ECU 5 including itself, that is, detects the abnormality in the main lamp control unit 51, the sub-lamp control unit 52, and the camera control unit 53. Regarding monitoring of the main lamp control unit 51 and the sub-lamp control unit 52, a state in which the main lamp unit 2 or the sub-lamp unit 3 is not lighted normally is detected as abnormal. In this case, cause of the abnormality is also detected.

Regarding monitoring of the camera control unit 53, the abnormality in the camera 4 and the abnormality in the captured image are detected. The former detects a state in which normal imaging is not performed in the camera 4 as the abnormality. The latter analyzes the image captured by the camera 4 and obtained by the camera control unit 53, and detects as the abnormality that the other vehicle cannot be accurately detected. For example, it is a state in which when a deposit or a scratch occurring on an outer surface of the light transmitting cover 12 is detected from the captured image, the other vehicle is not normally detected due to the deposit or the scratch. Then, the monitoring unit 54 outputs the abnormality signal when these abnormalities are detected.

The above-mentioned right headlamp R-HL and left headlamp L-HL are provided in the car CAR via a bus line BL as shown in FIG. 3 and are connected to a vehicle ECU (vehicle Electronic Control Unit) 6 for performing comprehensive control related to running of the car CAR. That is, the lamp ECUs 5 of the left and right headlamps L-HL, and R-HL are respectively connected to the bus line BL, and the vehicle ECU 6 is also connected to the bus line BL. It is configured such that the lamp ECUs 5 and the vehicle ECU 6 mutually input and output signals through the bus line BL. CAN (Controller Area Network) or LIN (Local Interconnect Network) installed in the car can be used as the bus line BL.

Further, a monitor 7 for informing an occupant of various kinds of information is disposed in a vehicle compartment of the car CAR, and the monitor 7 is connected to the bus line BL. The monitor 7 displays the abnormality when the abnormality occurs in the headlamp, and further informs the occupant of measures for eliminating the abnormality or for coping with the abnormality. The monitor 7 may be configured with a display panel of a navigation device. Further, an ignition switch 8 and a lamp switch 9 are connected to the bus line BL. When the ignition switch 8 is turned on, the vehicle ECU 6 is driven. Further, when the lamp switch 9 is turned on, the left and right headlamps L-HL and R-HL are turned on, and the lighting control is performed.

According to the above configuration, in the left and right headlamps L-HL and R-HL (hereinafter, both headlamps may be collectively referred to as a headlamp), when the lamp switch 9 is turned on, the headlamp is turned on, the lamp units 2 and 3 are turned on by each lamp ECU 5, and at the same time, the monitoring unit 54 monitors its own headlamp. When no abnormality is detected, the main lamp control unit 51 and the sub-lamp control unit 52 of the lamp ECU 5 respectively control lighting of the main lamp unit 2 and the sub-lamp unit 3.

Figure 4:
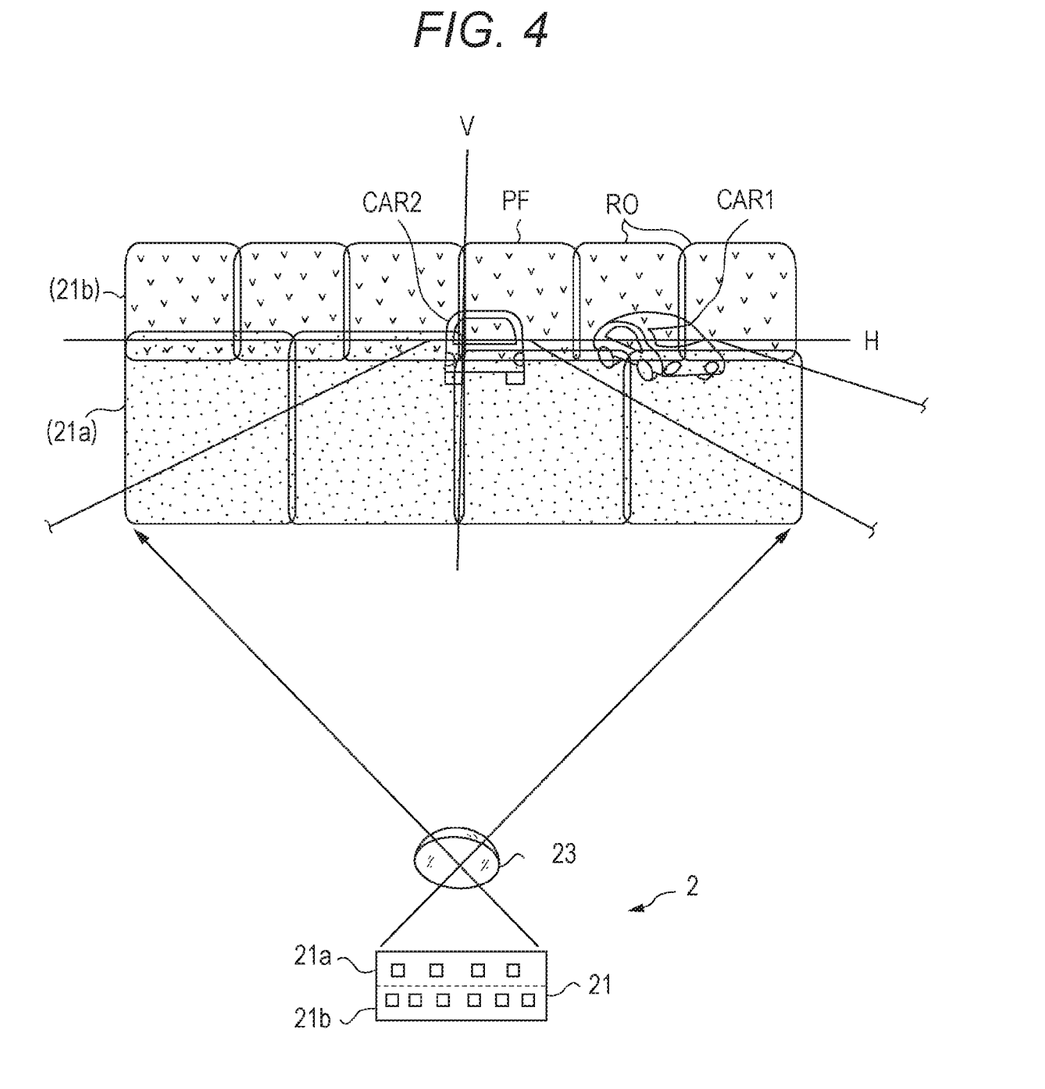
FIG. 4 is a schematic view illustrating light distribution of a main lamp unit.

As shown in FIG. 4, the plurality of white LEDs 21 constituting the light source of the main lamp unit 2 is arranged in two rows of first row of four LEDs 21*a* and second row of six LEDs 21*b*. An illumination region on which light of each of the white LEDs 21 (21*a*, 21*b*) is projected by the projection lens 23 corresponds to each cell area in the light distribution pattern in the upper portion of FIG. 4. In the lighting control of the main lamp unit 2 by the main lamp control unit 51, when the lighting control unit 512 of the lamp ECU 5 emits the light of the first row LED 21*a*, the low beam light distribution stippled in FIG. 4 is obtained. Further, when the first row and the second row LEDs 21*a* and 21*b* emit light, the high beam light distribution including the stippled illumination region and check-marked illumination region in FIG. 4 is obtained.

In ADB light distribution control, the other-vehicle detection unit 531 detects the other vehicle based on the image captured by the camera 4. When the other vehicle is detected, the lighting control unit 512 selectively emits the white LEDs other than the white LEDs corresponding to the other vehicle among all the white LEDs 21 (21*a*, 21*b*). In an example of FIG. 4, for an oncoming vehicle CAR1, the white LEDs corresponding to a region PO is turned off, and the other white LEDs are emitted. For a preceding vehicle CAR2, the white LED corresponding to a region PB is turned off, and the other white LEDs are emitted. Thus, it is possible to obtain the ADB light distribution for illuminating a region in front of own vehicle as brightly as possible without causing other vehicles CAR1 and CAR2 to be dazzled.

The lighting control is performed independently in each of the left and right headlamps L-HL and R-HL. That is, since the cameras 4 of the left and right headlamps L-HL and R-HI, capture substantially the same image, the lighting controls of the left and right headlamps L-HL and R-HL are also basically the same. Specifically, since the ADB light distribution control is performed independently for each of the headlamps L-HL and R-HL, when accuracy of the ADB light distribution control in one of the headlamps is reduced, or even when the ADB light distribution control in one of the headlamps cannot be performed, it is possible to ensure the ADB light distribution control of an entire vehicle by the other headlamp.

Further, in this embodiment, when one headlamp among the plurality of headlamps is abnormal, the lamp ECU of the other headlamp controls lighting of the normal lamp units 2 and 3. That is, when any one of the lamp units 2 and 3, the camera 4 and the lamp ECU 5 of one of the left and right headlamps L-HL and R-HL is abnormal, the vehicle ECU 6 or the lamp ECU 5 of the other headlamp controls lighting of at least one of the normal lamp units, including the abnormal headlamp or the normal headlamp. An example of this lighting control will be described next.

Figure 5:
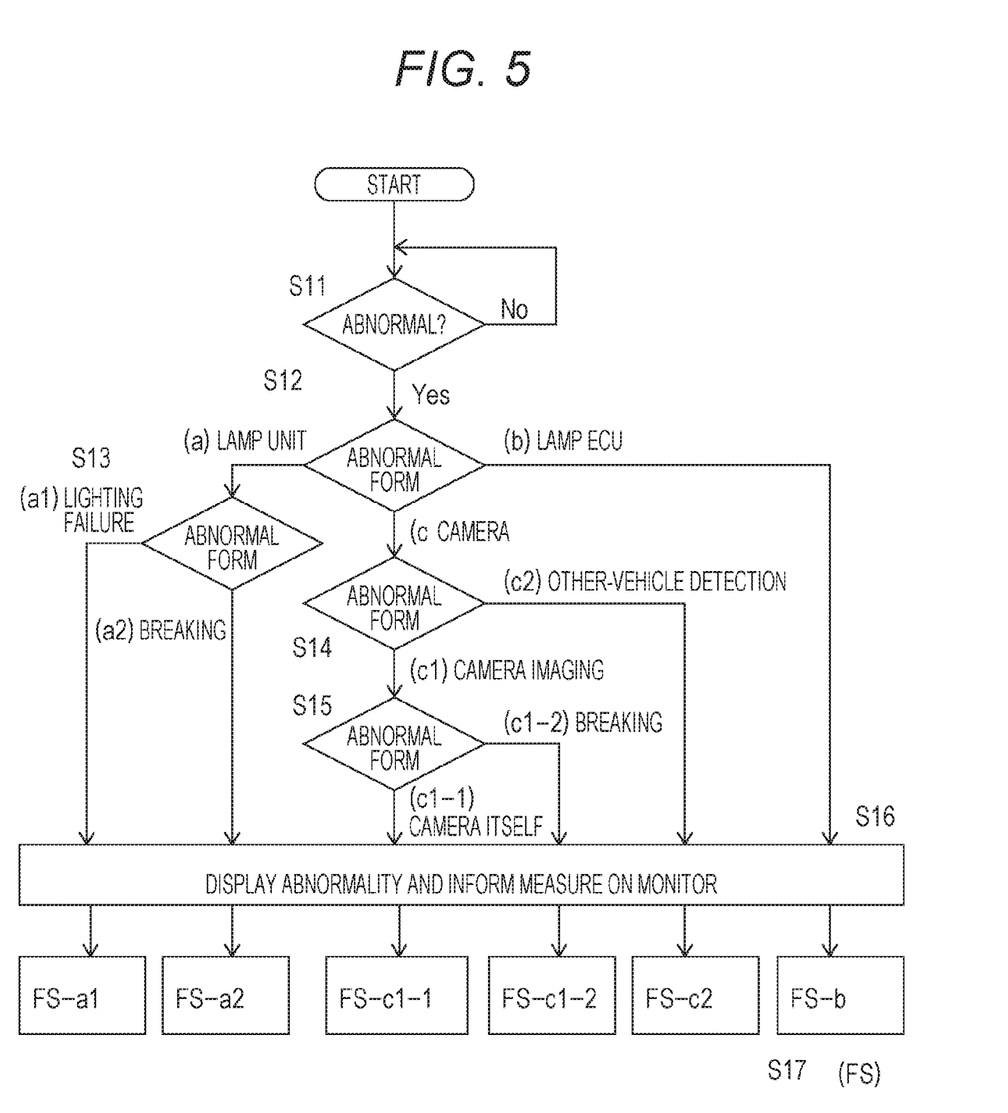
FIG. 5 is a basic flowchart of lighting control in an embodiment.

FIG. 5 is a basic flowchart of lighting control in the embodiment. In each headlamp, the monitoring unit 54 of the lamp ECU 5 monitors the abnormality of its own headlamp (S11). When the abnormality is detected, location of the abnormality is detected, and the detection signal is output to the bus line BL (S12). Here, the following abnormal forms (a) to (c) are determined as abnormal.
(a) Abnormality of main or sub lamp
(b) Abnormality of lamp ECU
(c) Abnormality of camera Here, in the case of the abnormal form next abnormal forms (a1) and (a2) are determined (S13).
(a1) Abnormality of main lamp unit or sub-lamp unit itself
(a2) Connection abnormality (breaking) between lamp ECU and each lamp unit In the case of the abnormal form (c), the following abnormal forms (c1) and (c2) are determined (S14).
(c1) Abnormality in imaging with camera
(c2) Abnormality in detecting other vehicles Further, in the case of the abnormal form (c1), the next abnormal forms (c1-1) and (c1-2) are determined (S15).
(c1-1) Abnormality of camera itself
(c1-2) Connection abnormality between camera and lamp ECU (breaking)

When the vehicle ECU 6 obtains the detection signals of these abnormal forms (a) to (c) detected by the monitoring unit 54 through the bus line BL, the monitor 7 displays the abnormality (S16). At this time, the monitor 7 also informs the abnormal form, and informs preferable measures for eliminating the abnormality or for coping with the abnormality together.

At the same time, the vehicle ECU 6 or the lamp ECU 5 performs lighting control FS of the headlamp n which the abnormality occurs (hereinafter referred to as an abnormal headlamp) as a fail-safe (S17). The lighting control FS in this step S17 is one of FS-a to FS-c depending on differences in the abnormal form, and will be separately described below.
(a) Abnormality in lighting main and sub lamp units
(a1) Abnormality of main lamp unit or sub-lamp unit itself This abnormal form is a form in which the lamp units 2 and 3 do not light at all, for example, because the white LED 21 as the light source is broken, and cannot be recovered unless the lamp units 2 and 3 are repaired or replaced. The vehicle ECU 6 displays the abnormal headlamp and the abnormal lamp unit on the monitor 7 and informs that the headlamp or the lamp unit needs to be repaired or replaced.

At the same time, the vehicle ECU 6 performs lighting control FS-a1. That is, in the abnormal headlamp, when any one of the main lamp unit 2 and the sub-lamp unit 3 is normal, the normal lamp unit is turned on. At this time, when the main lamp unit 2 is normal, the lamp ECU 5 performs controls of the normal low beam light distribution, high beam light distribution, and ADB light distribution. When the main lamp unit 2 is abnormal, the lamp ECU 5 only controls lighting of the sub-lamp unit 3.

When both lamp units 2 and 3 do not light at all, or when only the sub-lamp unit 3 is normal, the vehicle ECU 6 confirms that the other head lamp is normal, and increases an amount of light of the normal head lamp in the lamp ECU 5 of the normal head lamp. This compensates for reduction in the amount of light of the headlamps of an entire car to improve safety. For example, when the main lamp unit 2 is turned on but the sub-lamp unit 3 is turned off in the normal headlamp, the sub-lamp unit 3 is turned on. Further, when the main lamp unit 2 is turned on with the low beam light distribution, the high beam light distribution control or the ADB light distribution control is performed.

(a2) Connection abnormality (breaking) between lamp unit and lamp ECU

This abnormal form is a form in which wiring connecting the lamp units 2, 3 and the lamp ECU 5 is broken, and cannot be restored unless connection between the lamp units 2, 3 and the lamp ECU 5 is repaired. The vehicle ECU 6 displays on the monitor 7 that a connecting portion of the abnormal headlamp is abnormal, and informs that the portion needs to be repaired.

At the same time, the vehicle ECU 6 performs lighting control FS-a2. For example, in the case where the connection of any one of the main lamp unit 2 and the sub-lamp unit 3 in the abnormal headlamp is normal, a normally connected lamp unit among the main lamp unit 2 and the sub-lamp unit 3 is turned on.

When the connection of both lamp units 2 and 3 is abnormal, the vehicle ECU 6 increases the amount of light of the normal headlamp by the lamp ECU 5 of the normal headlamp to compensate for the reduction in the amount of light of the headlamps of the entire car as in the case of the abnormal form (a1).

(b) Abnormality of lamp ECU

This abnormal form is a form in which a failure occurs in any or all of the units 51 to 53 constituting the lamp ECU 5, and it is necessary to repair or replace the respective units or an entire lamp ECU 5. The vehicle ECU 6 displays on the monitor 7 that the abnormal headlamp and its lamp ECU 5 are abnormal and informs that the lamp ECU 5 needs to be repaired or replaced.

Further, the vehicle ECU performs lighting control FS-b. That is, the vehicle ECU examines the abnormal form of the abnormal lamp ECU 5, and when either the main lamp control unit 51 or the sub-lamp control unit 52 is normal, the normal lamp control unit 51 or 52 turns on the main lamp unit 2 or the sub-lamp unit 3. Here, when the main lamp control unit 51 is abnormal, the main lamp unit 2 is turned off in order to prevent the main lamp unit 2 from freezing with the high beam distribution. Or, the lighting control to fix the low beam distribution is performed, if possible.

When both the main lamp control unit 51 and the sub-lamp control unit 52 are abnormal in the abnormal lamp ECU 5, the vehicle ECU 6 outputs a lighting control signal output from the lamp ECU 5 of the normal headlamp to the abnormal headlamp through the bus line BL. Thus, the main lamp unit 2 and the sub-lamp unit 3 of the abnormal headlamp are controlled to be lit by the lighting control signal input from the lamp ECU 5 of the normal headlamp.

For example, the lighting of the main lamp unit 2 of the abnormal headlamp is controlled by the lighting control signal output from the main lamp control unit 51 of the normal lamp ECU 5. The lighting of the sub-lamp unit 3 of the abnormal headlamp is controlled by the lighting control signal output from the sub-lamp control unit 52 of the lamp ECU 5 of the normal headlamp.

Here, when the main lamp control unit 51 is normal but the camera control unit 53 has an abnormality, since lighting control FS-c2 the same as in the abnormal form (c2) in which other vehicles cannot be detected of the abnormal form (c) described below is performed as the lighting control FS-b, description is omitted here.

In the above, when it is difficult to perform the lighting control FS-a1 and FS-b, the vehicle ECU 6 may forcibly control the main lamp unit 2 of the abnormal headlamp to the low beam light distribution. Or, the vehicle ECU 6 may forcibly control the sub-lamp unit 3 to be turned on.

(c1) Abnormality in imaging with camera (c1-1) Abnormality of camera itself

This abnormal form is a form in which the image (an image signal) captured by the camera 4 is not output. In this case, it cannot be restored unless the camera 4 is repaired or replaced. The vehicle ECU 6 displays the abnormality of the camera 4 of the abnormal headlamp on the monitor 7 and informs that the camera 4 needs to be repaired or replaced.

In this abnormal form, lighting control FS-c1-1 of the vehicle ECU 6 outputs the image captured by the camera 4 of the normal headlamp and output from the camera control unit 53 of the lamp ECU 5 to the lamp ECU 5 of the abnormal headlamp through the bus line BL. When the lamp ECU 5 of the abnormal headlamp controls the lighting of the main lamp unit 2 by the main lamp control unit 51, the lighting control signal output from the main lamp control unit 53 of the lamp ECU 5 of the normal headlamp may be output directly to the main lamp control unit 51 of the abnormal headlamp from the bus line BL without through the vehicle ECU 6 to perform the lighting control.

(c1-2) Abnormality in connection between camera and lamp ECU

This abnormal form is a form in which the wiring connecting the camera 4 and the lamp ECU 5 is broken, and cannot be recovered unless the connection between the camera 4 and the lamp ECU 5 is repaired. The vehicle ECU 6 displays the abnormal headlamp and its abnormal portion on the monitor 7 and informs that the connection needs to be repaired.

The vehicle ECU 6 performs lighting control FS-c1-2 the same as the lighting control FS-c1-1. That is, the vehicle ECU 6 outputs the image captured by the camera 4 of the normal headlamp and output from the camera control unit 53 of the lamp ECU 5 to the lamp ECU 5 of the abnormal headlamp via the bus line BL. Thus, the lamp ECU 5 of the abnormal headlamp controls lighting of the main lamp unit 2 by the main lamp control unit 53.

(c2) Abnormality in detection of another vehicle

This abnormal form is a case in which the camera 4 is normal and can capture the image, the camera ECU 5 is also normal, and the captured image can be output from the camera control unit 53, but the other-vehicle detection unit 531 of the camera control unit 53 cannot detect the other vehicle from the image with high accuracy. A cause of this abnormality is that there is the deposit or the scratch on the outer surface (surface) of the light transmitting cover 12 of the lamp housing 1 in which the camera 4 is installed, and it is difficult to detect the other vehicles due to the deposit or the scratch even if the captured image is analyzed.

Figure 6:
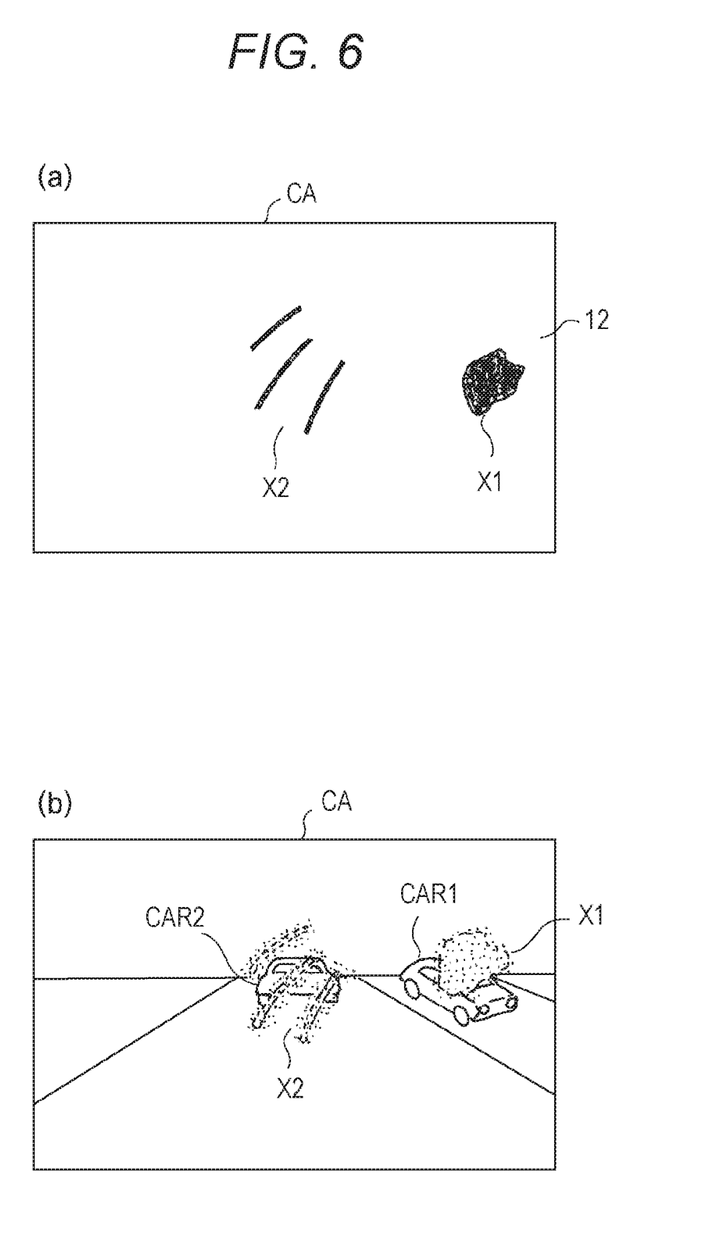
FIGS. 6A and 6B are schematic views illustrating an abnormality in detection of another vehicle in a captured image.

That is, as shown in FIG. 2, the camera 4 images the region in front of the car through the light transmitting cover 12. At this time, if there is the deposit or the scratch in a partial region of the outer surface of the light transmitting cover 12, particularly in a range of an imaging angle of view of the camera 4, that is, an imaging region, an image of the deposit or the scratch is captured in the captured image. For example, as shown in FIG. 6A, when there are a deposit X1 and a scratch X2 in an imaging region CA of the light transmitting cover 12, the image of the deposit X1 and the scratch X2 or a blurred image of these is captured in the image captured by the camera 4 as shown in FIG. 6B. Therefore, when the image of the deposit X1 and the scratch X2 overlaps the other vehicles CAR1 and CAR2 present in the captured image, detection accuracy of the other vehicles by image analysis is reduced, and as a result, accuracy of the light distribution control is also reduced.

Here, a form of the deposit is roughly divided into (p) water droplets, (q) mud, insect or the like. The former water droplets are water droplets such as raindrops adhering to the surface of the light transmitting cover 12 or water droplets due to condensation of water vapor occurring on an inner surface of the light transmitting cover 12 in the lamp housing 1. On the other hand, there is the scratch occurring on the surface of the light transmitting cover 12 and cracks, breakages and the like in a part of the light transmitting cover 12, as a form of the scratch. However, since they are basically the same, they are summarized scratch or the like here.

Figure 7:
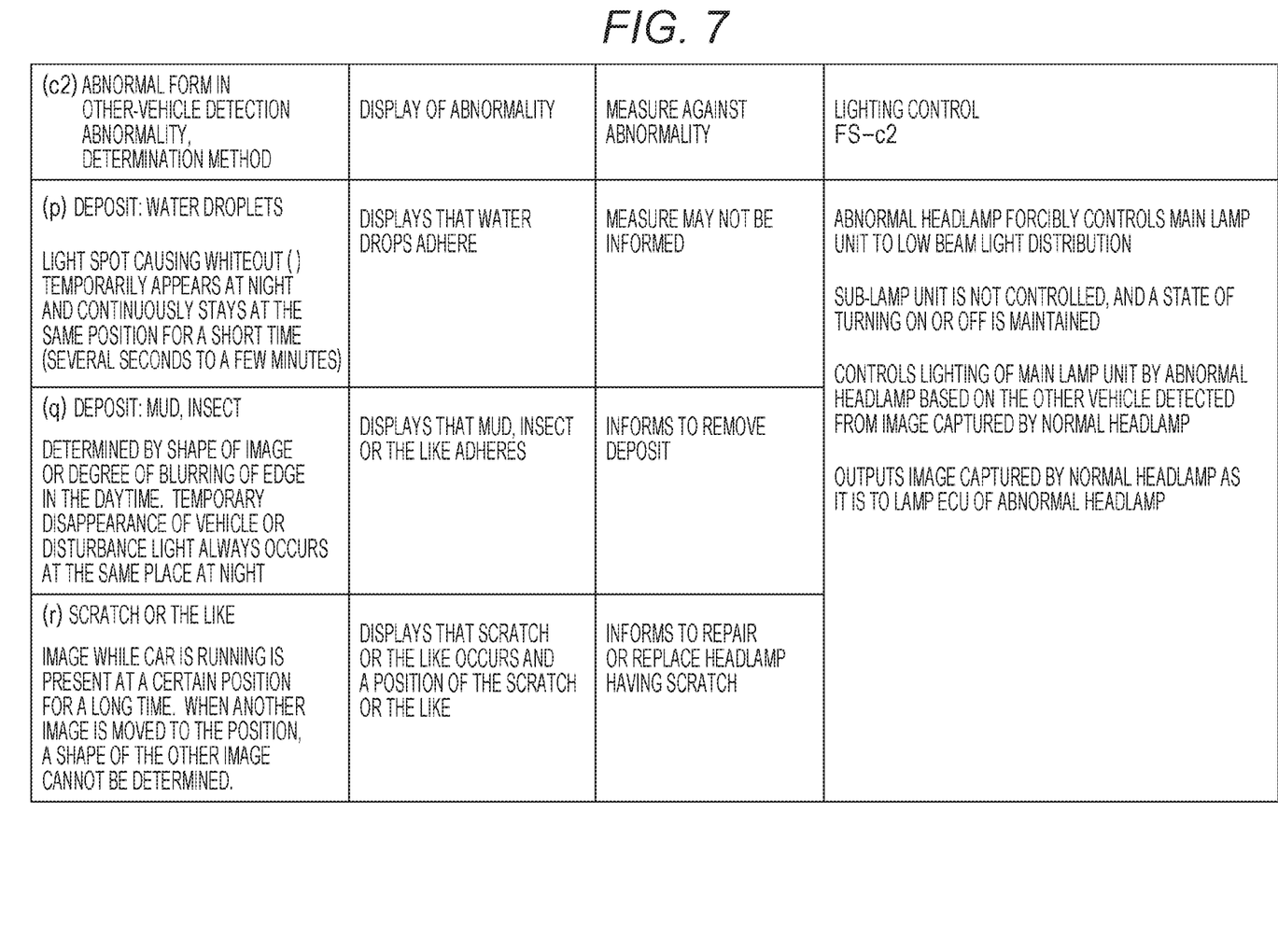
FIG. 7 is a view showing a form of the abnormality in detection of the other vehicle, its display, measures, and lighting control.

The monitoring unit 54 determines the deposit, the scratch or the like, but based on the captured image, for example, as summarized in a table of FIG. 7. When (p) water droplets adhere, it is determined by that a light spot causing whiteout (halation) temporarily appears at night and continuously stays at the same position for a short time (several seconds to a few minutes). Further, when (q) mud, insect or the like adheres, it is determined by a shape of the captured image or degree of blurring of an edge in the daytime. At night, it is determined by that temporary disappearance of the vehicle or disturbance light always occurs at the same place.

On the other hand, in the case of (r) scratch or the like, it is determined by that the image captured while the car is running is present at a certain position for a long time, and when another image is moved to the position, a shape of the other image cannot be determined.

Regarding display of abnormality and the measures for the abnormal forms, which is performed by the vehicle ECU 6, displays that the water droplets adhere on the monitor 7 when (p) water droplets adhere. In this case, it is not necessary to particularly inform the measures. This is because the water droplets are likely to be removed over time. The occupant who has seen the display may remove the water droplets manually while looking at the display of the monitor 7. Or, in the case of the headlamp with air cleaner, the air cleaner may be manually or automatically driven to remove the water droplets.

When (q) mud, insect or the like adheres, the vehicle ECU 6 displays that the mud, insect or the like adheres on the monitor 7. At the same time, the vehicle ECU 6 informs to remove the deposit. The occupant sees the display of the monitor 7, and manually cleans the surface of the light transmitting cover 12 to remove the mud, insect or the like.

In the case of (r) scratch or the like, the vehicle ECU 6 displays that the scratch or the like occurs and a position of the scratch or the like on the monitor 7. At the same time, the vehicle ECU 6 informs that it is necessary to repair or replace a target headlamp. The occupant sees the display of the monitor 7 to repair the scratch or the like occurring on the light transmitting cover 12 or replace it with a new one.

As described above, in the case of the abnormality in which the other-vehicle detection unit 531 cannot detect the other vehicle from the captured image due to the deposit, the scratch or the like, the vehicle ECU 6 displays the abnormality and informs the preferable measures on the monitor 7, so that an abnormal state is improved, and normal lamp control can be realized thereafter. In a situation where the abnormal state is not improved, the vehicle ECU 6 performs the lighting control FS-c2.

That is, for the abnormal headlamp, the vehicle ECU 6 forcibly controls the main lamp unit 2 to the low beam light distribution by the lamp ECU 5. This prevents the other vehicles from being dazzled due to the high beam light distribution and the ADB light distribution control. The sub lamp-unit 3 is not particularly controlled, and a normal state of turning on or off is maintained. This control is performed particularly when there is the abnormality in which the other-vehicle detection units 531 of both the left and right headlamps cannot detect the other vehicle.

When there is the abnormality in detection of the other vehicle in either the left or right headlamp, the vehicle ECU 6 outputs the lighting control signal from the lamp ECU 5 of the normal headlamp to the abnormal headlamp, to control lighting of the main lamp unit 2 of the abnormal headlamp, that is, when the other-vehicle detection units 531 detects the other vehicle from the image captured by the camera 4 of the normal headlamp, and the lighting control signal to perform the proper high beam light distribution control and the ADB light distribution control is output to the other vehicle. In this way, also in the abnormal headlamp, it is possible to realize suitable lighting control of the main lamp unit 2, particularly the high beam distribution control and the ADB light distribution control.

Here, as a modification of the lighting control FS-c2, the vehicle ECU 6 may output the image captured by the camera 4 of the normal headlamp as it is to the lamp ECU 5 of the abnormal headlamp. The lamp ECU 5 of the abnormal headlamp performs an interpolation process on the image captured by the camera 4 of the abnormal headlamp with the image output from the normal headlamp. That is, it is a process which replaces a part, in which the deposit part, the scratch or the like difficult to detect the other vehicle is imaged, with the part of the image from the normal headlamp. Then, the other vehicle is detected by the other-vehicle detection unit 531 of the abnormal headlamp based on the image subjected to the interpolation process. Thus, even in the abnormal headlamp, it is possible to perform the lighting control by its own lamp ECU 5.

The interpolation of the image is effective when a ratio of a region in which the image is unclear due to the deposit, the scratch or the like is 50% or less of an entire screen. When the unclear region has the above ratio or more, since reliability of the interpolation is reduced, the lighting control based on the lamp ECU 5 of the normal headlamp is preferable.

In addition, it is conceivable to provide a protective cover on the surface of the light transmitting cover as an effective method to the abnormality due to the deposit or the scratch occurring on the light transmitting cover. For example, a transparent resin film is provided on the surface of the light transmitting cover with an adhesive. By providing the resin film, when the deposit or the scratch occurs, it is possible to remove the deposit or the scratch by removing the resin film and attaching a new resin film again, thereby increasing accuracy of detection of the other vehicle by the camera.

In the embodiment, the vehicle ECU is configured such that the abnormality is displayed on the monitor, the measure at that time is informed, and the lighting control of the lamp is performed. However, the monitoring unit of the lamp ECU, which is provided at each of the lamps, may be configured to display the abnormality, inform the measure, and perform the lighting control. The monitor for displaying abnormality in the present invention is not necessarily limited to one that performs visual display, but may be in any form that displays the abnormality by sound, vibration or the like. This can also be applied to informing of the measure against the abnormality, and may be informing by voice or the like.

In the detection of abnormality in the present invention, the monitoring unit in the lamp ECU does not necessarily monitor its own lamp, and the lamp ECUs of the plurality of lamps may be configured such that each monitoring unit detects an abnormality in another lamp.

The lighting control as the fail-safe for the abnormality in the present invention may not be performed through the vehicle ECU, but the lamp ECU of the normal lamp may directly control the abnormal lamp to be lighted.

The present invention is not limited to the headlamp, and can be applied to any lighting lamp configured to control the lighting state, particularly the light distribution during lighting. Further, the number of lamps may be three or more, and if one of the lamps is normal, it is possible to control lighting of other abnormal lamps.

This international application claims priority based on JP-A-2016-230769 filed Nov. 29, 2016, and the disclosure of JP-A-2016-230769 is herein incorporated by reference in its entirety.

The foregoing descriptions of specific embodiments of the present invention have been presented for purposes of illustration. They are not intended to be exhaustive or to limit the present invention to the form described as it is. It will be apparent to those skilled in the art that numerous variations and modifications are possible in light of the above description.

DESCRIPTION OF REFERENCE SIGNS

1: Lamp housing
2: Main lamp unit
3: Sub-lamp unit
4: Camera (Imaging unit)
5: Lamp ECU (Lamp electronic control unit)
6: Vehicle ECU (Vehicle electronic control unit)
7: Monitor
8: Ignition switch
9: Lamp switch
51: Main lamp control unit
52: Sub-lamp control unit
53: Camera control unit
54: Monitoring unit
511: Light distribution setting unit
512: Lighting control unit
531: Other-vehicle detection unit
L-HL, R-HL: Headlamp (Lighting lamp)
BL: Bus line
CA: Image
X1: Deposit
X2: Scratch.

The invention claimed is:

1. A vehicle lamp lighting control device comprising:
a first lamp comprising:
at least two first lamp units for illuminating a first region in front of a vehicle on which the vehicle lamp lighting control device is provided;
a first imaging unit for imaging the first region; and
a first lamp control unit for controlling lighting of the first lamp units based on an image captured by the first imaging unit; and
a second lamp comprising:
at least two second lamp units for illuminating a second region in front of the vehicle on which the vehicle lamp lighting control device is provided;
a second imaging unit for imaging the second region; and
a second lamp control unit for controlling lighting of the second lamp units based on an image captured by the second imaging unit,
the first lamp independently controls lighting of the first lamp units,
the second lamp independently controls lighting of the second lamp units,
when one of the first lamp units is abnormal, the second lamp control unit controls lighting of another first lamp unit which is not abnormal, and
when one of the second lamp units is abnormal, the first lamp control unit controls lighting of another second lamp unit which is not abnormal.

2. The vehicle lamp lighting control device according to claim 1, wherein the first lamp comprises a first monitoring unit for detecting abnormalities of the first lamp units, the first imaging unit, and the first lamp control unit, and the second lamp comprises a second monitoring unit for detecting abnormalities of the second lamp units, the second imaging unit, and the second lamp control unit.

3. The vehicle lamp lighting control device according to claim 2, further comprising an abnormality display unit for displaying detected abnormality to an operator that is connected to the monitoring unit of the first lamp and the second lamp through a bus line.

4. The vehicle lamp lighting control device according to claim 1, wherein either the lamp control unit of one of the first lamp and the second lamp that has an abnormal lamp unit or the lamp control unit of a normal lamp controls lighting of the one of the first lamp and the second lamp that has the abnormal lamp unit based on the image captured by the imaging unit of the normal lamp.

5. The vehicle lamp lighting control device according to claim 2, further comprising a vehicle control unit connected to each of the first lamp control unit and the second lamp control unit, wherein the vehicle control unit controls each of the first lamp control unit and the second lamp control unit based on a detection output of the monitoring unit of each of the first lamp and the second lamp.

6. The vehicle lamp lighting control device according to claim 1, wherein light distribution of the other lamp than the lamp on which an abnormality has occurred is controlled.

7. The vehicle lamp lighting control device according to claim 1, wherein light distribution of the first lamp and the second lamp change along a vertical direction of the vehicle on which the vehicle lamp lighting control device is provided.

8. The vehicle lamp lighting control device according to claim 1, wherein the whole amount of light irradiated from each of the first lamp and the second lamp is kept unchanged in an occasion that any of lamp has an abnormality.

9. The vehicle lamp lighting control device according to claim 1, wherein when any of the first lamp and the second lamp has an abnormality, an amount of light irradiated from the other lamp of the first lamp and the second lamp is increased so that the whole amount of light irradiated from the first lamp and the second lamp is kept unchanged.

10. The vehicle lamp lighting control device according to claim 2, wherein when one of the lamp control units of the first lamp and the second lamp has abnormality, a lamp control unit of the other lamp of the first lamp and the second lamp controls lighting of the one of the first lamp and the second lamp that has the lamp control unit having abnormality.

11. The vehicle lamp lighting control device according to claim 2, wherein when one of the at least two first lamp units has abnormality, the first lamp control unit increases the amount of lighting of the first lamp units except the one of the at least two first lamp units that has abnormality so that the whole amount of light irradiated from the first lamp is kept unchanged and when one of the at least two second lamp units has abnormality, the second lamp control unit increases the amount of lighting of the second lamp units except the one of the at least two first lamp units that has abnormality so that the whole amount of light irradiated from the second lamp is kept unchanged.

12. The vehicle lamp lighting control device according to claim 2, wherein when an imaging unit of one of the first lamp and the second lamp has abnormality, a lamp control unit of the other lamp of the first lamp and the second lamp controls lighting of the one of the first lamp and the second lamp that has the imaging unit having abnormality.

13. A vehicle lamp lighting control device comprising a plurality of lamps mounted on a vehicle, wherein
each of the plurality of lamps comprises:
at least two lamp units for illuminating a required region in front of a vehicle on which the vehicle lamp lighting control device is provided;
an imaging unit for imaging at least the required region; and
a lamp control unit for controlling lighting of the lamp unit based on an image captured by the imaging unit,
the lamp control unit of one of the plurality of lamps independently controls lighting of the lamp unit of the one of the plurality of lamps,
when a lamp unit of one of the plurality of lamps is abnormal, a lamp control unit of another lamp of the plurality of lamps controls lighting of at least one normal lamp unit of the one of the plurality of lamps in which the lamp unit is abnormal,
each of the lamp comprises a monitoring unit for detecting abnormalities of the lamp unit, the imaging unit, and the lamp control unit of at least its own lamp, and
the vehicle lamp lighting control device further comprises a vehicle control unit that controls lighting of the plurality of lamps, wherein when an imaging unit of one of the plurality of lamps has abnormality, an imaging unit of other lamps of the plurality of lamps sends captured images to the vehicle control unit, the vehicle control unit sends the image to a lamp control unit of the lamp of the plurality of lamps that has the imaging unit having abnormality so that the lamp control unit of the lamp of the plurality of lamps that has the imaging unit having abnormality controls lighting of the lamp.

14. A vehicle lamp lighting control device comprising a plurality of lamps mounted on a vehicle and a vehicle control unit that controls lighting of the plurality of lamps, wherein
each of the plurality of lamps comprises:
at least one lamp unit for illuminating a required region in front of a vehicle on which the vehicle lamp lighting control device is provided;
an imaging unit for imaging at least the required region; and
a lamp control unit for controlling lighting of the lamp unit in response to an abnormality of at least one of the lamp unit or the imaging unit, the abnormality being detected based on an image captured by the imaging unit so as to change light distribution of the plurality of lamps,
the lamp control unit of one of the plurality of lamps independently controls lighting of the lamp unit of the one of the plurality of lamps,
when one of the plurality of lamps is abnormal, the lamp control unit of the other lamp than the one of the plurality of lamps controls lighting of at least one normal lamp of the plurality of lamps,
the each of the plurality of lamps comprises a monitoring unit for detecting abnormalities of the lamp unit, the imaging unit, and the lamp control unit of at least its own lamp, and
when an imaging unit of one of the plurality of lamps has abnormality, an imaging unit of other lamps of the plurality of lamps sends captured images to the vehicle control unit, the vehicle control unit sends the image to a lamp control unit of the lamp of the plurality of lamps that has the imaging unit having abnormality so that the lamp control unit of the lamp of the plurality of lamps that has the imaging unit having abnormality controls lighting of the lamp.

15. The vehicle lamp lighting control device according to claim 14, further comprising an abnormality display unit for displaying detected abnormality to an operator that is connected to the monitoring unit of the plurality of lamps through a bus line.

16. The vehicle lamp lighting control device according to claim 14, further comprising the vehicle control unit connected to each of the lamp control units of the plurality of lamps, wherein the vehicle control unit controls each of the lamp control units based on a detection output of the monitoring unit of each of the plurality of lamps.

17. The vehicle lamp lighting control device according to claim 14, wherein light distribution of the plurality of lamps change along a vertical direction of the vehicle on which the vehicle lamp lighting control device is provided.

18. The vehicle lamp lighting control device according to claim 14, wherein the whole amount of light irradiated from each of the plurality of lamps is kept unchanged in an occasion that any of lamp has an abnormality.

19. The vehicle lamp lighting control device according to claim 14, wherein when one of the lamp control units of the plurality of lamps has abnormality, a lamp control unit of other lamps of the plurality of lamps controls lighting of the one of the plurality of lamps that has the lamp control unit having abnormality.

20. The vehicle lamp lighting control device according to claim 14, wherein each of the plurality of lamps further comprises one or more of the lamp units, and when one of the lamp units has abnormality, the lamp control unit of the lamp controls other lamp units of the lamp with the lamp unit having abnormality to increase the amount of lighting so that the whole amount of light irradiated from the lamp is kept unchanged.

* * * * *

UNITED STATES PATENT AND TRADEMARK OFFICE
CERTIFICATE OF CORRECTION

Page 1 of 1

PATENT NO. : 10,933,809 B2
APPLICATION NO. : 16/349684
DATED : March 2, 2021
INVENTOR(S) : Takenori Wama et al.

It is certified that error appears in the above-identified patent and that said Letters Patent is hereby corrected as shown below:

In the Specification

Column 3, Line 3, "be made the right leadlamp" should read -- be made with the right leadlamp --

Column 5, Line 50, "R-HI, capture substantially" should read -- R-HL capture substantially --

Column 6, Line 13, "abnormal form next" should read -- abnormal form (a), next --

Column 6, Line 35, "headlamp n which the" should read -- headlamp in which the --

Column 9, Line 13, "summarized scratch or" should read -- summarized as (r) scratch or --

Column 10, Line 59, "abnormality in the present" should read -- an abnormality in the present --

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*